(12) United States Patent
Puff

(10) Patent No.: US 6,357,656 B1
(45) Date of Patent: Mar. 19, 2002

(54) PRODUCTION AND VERIFICATION METHOD FOR AN ACCESS AUTHORIZATION MEANS AND CORRESPONDING ACCESS AUTHORIZATION MEANS

(76) Inventor: Johannes Puff, Adolfstrasse 100, D-53111 Bonn (DE)

( * ) Notice: Subject to any disclaimer, the term of this patent is extended or adjusted under 35 U.S.C. 154(b) by 0 days.

(21) Appl. No.: 09/485,913

(22) PCT Filed: Aug. 18, 1998

(86) PCT No.: PCT/EP98/05221

§ 371 Date: Feb. 16, 2000

§ 102(e) Date: Feb. 16, 2000

(87) PCT Pub. No.: WO99/09526

PCT Pub. Date: Feb. 25, 1999

(30) Foreign Application Priority Data

Aug. 18, 1997 (DE) .......................................... 197 35 628

(51) Int. Cl.$^7$ ................................................ G06K 5/00
(52) U.S. Cl. ...................... 235/382; 235/492; 235/380; 235/383; 235/439; 235/487
(58) Field of Search ................ 235/380, 382, 235/492, 383, 439, 457

(56) References Cited

U.S. PATENT DOCUMENTS

| | | | | |
|---|---|---|---|---|
| 3,959,630 | A | * 5/1976 | Hogerg ................. | 235/61.12 N |
| 4,218,674 | A | 8/1980 | Brosow et al. ............. | 340/149 |
| 4,682,794 | A | * 7/1987 | Margolin ..................... | 283/82 |
| RE36,580 | E | * 2/2000 | Bogosian, Jr. .......... | 235/382 X |
| 6,205,233 | B1 | * 3/2001 | Morley et al. ............... | 382/103 |
| 6,213,391 | B1 | * 4/2001 | Lewis ......................... | 235/380 |
| 6,221,296 | B1 | * 4/2001 | James et al. ................. | 264/153 |
| 6,228,657 | B1 | * 5/2001 | Genovese et al. .......... | 436/167 |

FOREIGN PATENT DOCUMENTS

| | | |
|---|---|---|
| DE | 43 22 642 | 1/1994 |
| EP | 0 682 328 | 11/1995 |
| JP | 02000132658 A | * 5/2000 |
| JP | 02001092786 A | * 4/2001 |
| WO | WO91/19614 | 12/1991 |

OTHER PUBLICATIONS

Nelson, Benjamin. Helmers Publishing Company. 1997 (no month listed). Punched Cards to Bar Codes, p. 185.*

* cited by examiner

*Primary Examiner*—Michael G. Lee
*Assistant Examiner*—Daniel Walsh
(74) *Attorney, Agent, or Firm*—Collard & Roe, P.C.

(57) ABSTRACT

The invention relates to a method for producing and verifying a non-personal access authorization means (1), and a corresponding access authorization means, especially an entrance ticket (1) for carrying out the method. The aim of the invention is to reduce the risk of such an access authorization means being produced fraudulently. To this end, the invention provides that the following steps are taken; application of biogenically structured material (3) to the access authorization means (1); defined determination of the characteristic parameters of said biogenic material (3); storage of the recorded parameter data in data sets; verification by defined measurement of the predetermined parameters and comparison of the parameter data with the available data sets; and authorization of entry when the defined match criteria are satisfied. The biogenic material (3) is preferably integrated into a material (2) which is transparent to the measuring process used.

13 Claims, 1 Drawing Sheet

PRODUCTION AND VERIFICATION METHOD FOR AN ACCESS AUTHORIZATION MEANS AND CORRESPONDING ACCESS AUTHORIZATION MEANS

BACKGROUND OF THE INVENTION

1. Field of the Invention

The invention relates to a method for producing a non-personal access authorization means and for verifying the access authorization. Furthermore, the object of the invention is an access authorization means, in particular an admission card for carrying out the method as defined by the invention.

2. Prior Art

Admission cards sold by organizers of, for example musical concerts, sporting and cultural as well as other events for the price of attending such events, are the most widely used form of non-personal authorization means, serving the purchasers of such admission cards as access authorization means for attending the respective event.

A growing problem is the unauthorized duplication of admission cards or other type of access authorization means. Duplicates of legally purchased tickets are produced in this connection by means of commonly employed reproduction methods, ranging from photostatic copying to sophisticated printing methods, and such duplicates are then sold illegally. In addition to substantially losses suffered by the organizers, such unauthorized duplication also creates situations that sometimes even may be dangerous for the audience or spectators of such events, because the non-reproducible number of forged admission cards leads to overbooking of the seats available for an event.

For the purpose of preventing such misuse, it is already known in the prior art to produce admission cards that are assumed to be counterfeit-proof. For this purpose, coded information, for example, is imprinted with visible or invisible colors, and in particular paper with metal filaments or other inserts is employed; or water-marks are impressed, or metallic strips microchips are integrated, or holograms are used. It is, in fact, no longer possible to simply duplicate admission cards prepared in such a way. However, it is increasingly found that such signatures practically pose no obstacle to professional, well-equipped counterfeiters, so that forged admission cards can practically not be distinguished from "originals" assumed to be counterfeit-proof.

Another known method, in connection with which each individual admission card is provided with an individual identification code, and access is permitted only if said identification code corresponds with a code contained in a databank, does in fact offer the advantage that the number of admitted persons remains controllable. However, said method is afflicted with the drawback that access no longer can be gained with legally obtained admission cards if the access authorization has been previously invalidated by a forged card. In addition, it is not possible for the public to recognize up front whether an admission card is a forged card or not, because such a forgery cannot be exposed by available relevant control measures.

Another possibility of increasing the security against falsification by detecting personal features, for example fingerprints, would hardly find acceptance by the public in general, on the one hand, and would be deemed more than questionable for data safety protection reasons.

SUMMARY OF THE INVENTION

Based on the situation explained above, the problem of the present invention is to make available a production and verification method for access authorization means, in particular admission cards, as well as suitable access authorization means for implementing said method, such access authorization means offering increased safety against forgery without the use of person-specific features.

For solving said problem, the invention proposes a method with the following steps of the method:

- Application of biogenically structured material to the access authorization means;
- defined detection of characteristic parameters of the biogenic material;
- storage of the recorded parameter data in data sets;
- verification by defined measurement of the predetermined parameters and comparison of the parameter data with the available data sets; and
- authorization of entry when defined criteria of coincidence are satisfied.

According to the invention, an access authorization means of the type known per se such as, for example an admission ticket consisting of paper, cardboard or plastic, is provided with an organic substrate which practically represents a biogenic signature. For said purpose, a plant substrate with components of leaves or blossoms and also tissue cuts, is undetachably secured on the access authorization means. The use of leaves or petals offers in this connection the advantage that such elements are a regrowing raw material that causes no ecological damage if collected in a careful way.

Suitably, use is made of a plant material with a clearly recognizable structure that permits such material to be identified in a simpler way accordingly. As an alternative, the use of material of animal origin is conceivably possible, employing materials ranging from pieces of tissue up to microbiologically produced substrates. Even the use of fossil preparations is conceivable.

The special advantage offered by the use of such biogenic material as defined by the invention lies in that its—frequently fractured—structure is coincidental to a large extent on the macroscopic scale, so that such a structure represents in each case a type of "biogenic fingerprint" that is absolutely unique with respect to its characteristic structural parameters, i.e. with respect to the parameters of its shape and material.

According to the next-following step of the method as defined by the invention, such characteristic parameters are detected without destruction with the help of pre-defined measuring methods, which, for example, may be locally limited or comprehensive, employing suitable measuring methods. For example, it is possible with the help of optical measuring methods to record, for example the contours of a leaf as well as its nervation in selected areas. Other measured values may contain, for example also the local spectral absorptive power or the like. Organic matter can be distinguished from artificial forgeries by means of simple analysis.

The characteristic parameter data acquired in said manner are stored as data sets in computer data banks and consequently can be handled in a particularly efficient manner. Authorized admission card sales outlets can be easily supplied with data via mass storage media such as CD-ROM or the like.

The access authorization is verified by another defined measurement of the parameters predetermined in the detection process. Said measurements can be carried out in a reproducible way with high accuracy by means of automated measuring equipment, so that the subsequent comparison of the parameter data acquired in said reading process, with the stored data sets previously acquired, permits unambiguous identification.

Access is authorized only once the comparison satisfied the previously defined coincidence criteria, i.e. if such comparison shows conformity of the features within a defined error tolerance range.

The special advantage of the invention lies in that each biogenically structured material specimen is absolutely unique, on the one hand, and impossible to reproduce in all of its details by means of technical production methods with justifiable expenditure, on the other hand, i.e. with each and every detail that can be used as a coincidence criterion. Duplication by means of available printing technology is excluded, for example if only because a leaf of a plant, for example, in addition to its visible pattern, has a spatial structure that is practically familiar to most people of the same cultural complex, so that such a structure consequently can be recognized as such also without any special instructions. Therefore, safe and quick access control is possible in a quick and safe manner even for access control personnel overloaded by work under adverse conditions.

The verification process can be simplified at the same time and made even safer against falsification attempts by acquiring and measuring the parameters according to measuring instructions specified on the access authorization means. In order to increase the safety against manipulation, the measuring instructions are preferably encoded in a reference statement which, for example, only contains a numerical code that can be deciphered only in combination with corresponding code data files. For this purpose, a reference statement for a set of measuring instructions is preset in an admission card, for example in a machine-readable, coded form like a bar code, magnetic strip, memory chip, or in plain writing or the like. Such a reference statement, for example locally defines the measuring range or other values preset for the measuring method, which can then be automatically translated by the reading device in the course of the verification process.

The measurement as such can be carried out with optical or other measuring methods, for example NMR, magnetic and electrical methods, etc., because magnetic resonance methods offer the advantage, for example that the biogenic substance can be clearly identified.

The biogenic material is usefully preserved before it is applied to the access authorization means. Depending on the purpose of application it may be deemed desirable that such preservation is durable only up to a certain point in time, so that automatic invalidation will take place after such time.

Before the biogenic material is applied to the access authorization means it also may be additionally provided with an artificial identification or marking with the help of special preparation techniques. With the help of special dyeing techniques it is possible also to highlight structures that were not clearly visible before, and which therefore can be employed in a simpler way than identification features.

Furthermore, the object of the invention is an access authorization means, in particular an admission ticket for carrying out the method as defined by the invention and explained above. The biogenic material is in this connection usefully embedded in a material that is transparent to the measuring method to be applied.

A transparent plastic foil card with embedded plant components or other solid elements is in fact known already from DE 43 226 42 A1. However, the embedded material of said card only serves decorative purposes, so that its utilization for identification purposes has obviously not been suggested.

It is basically possible to use in an admission card as defined by the invention all materials discussed above, i.e. materials of both vegetable and animal origin.

In order to accelerate the reading process and to further enhance the coding as stated above, it is possible to provide the admission card with a machine-readable information carrier. Measuring instructions and other additional information can be stated, for example on a memory chip, magnetic strip or the like employed for said purpose.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention

DETAILED DESCRIPTION OF THE PREFERRED EMBODIMENT

Figure 1:
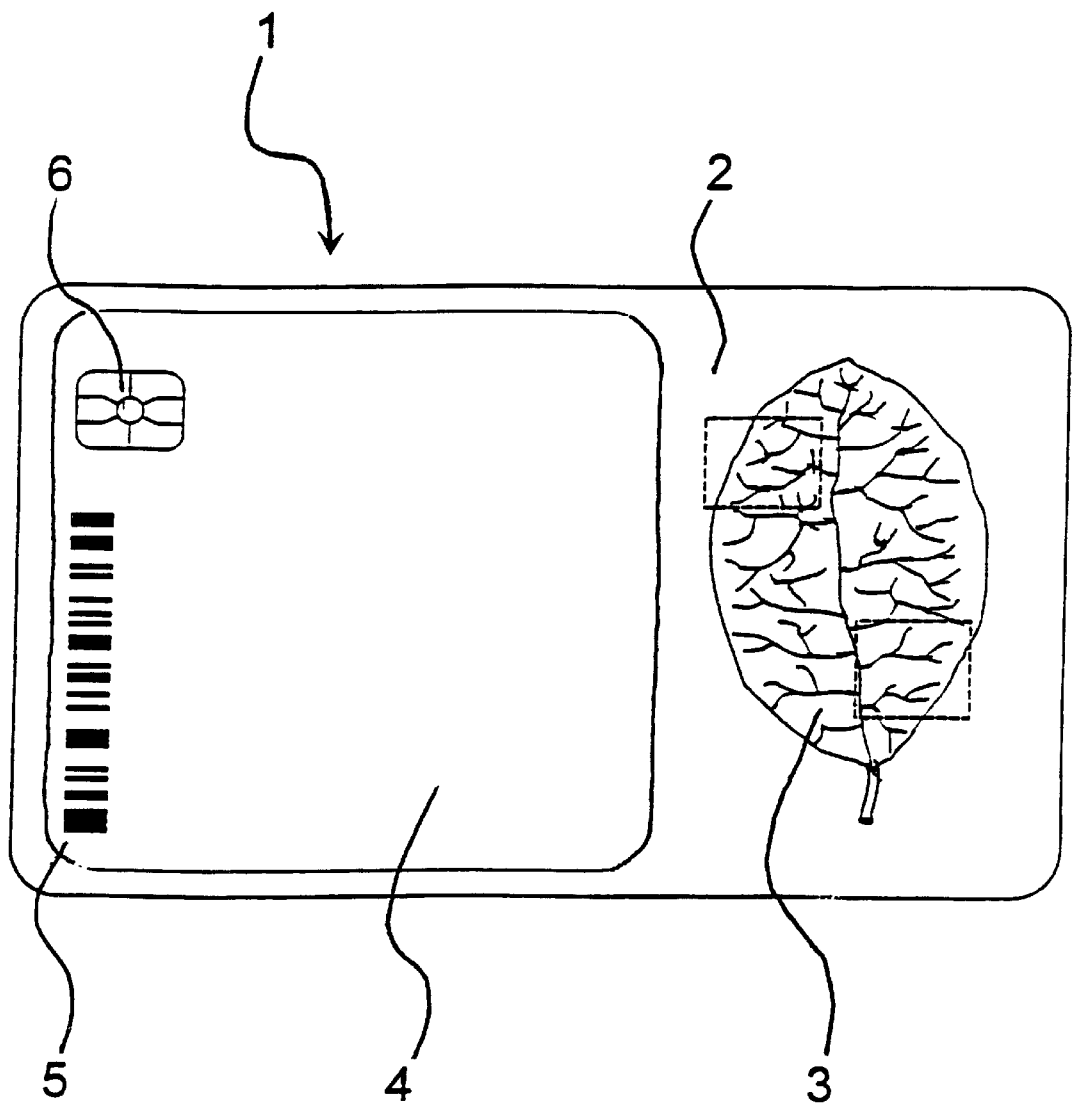
FIG. 1 shows an admission card according to the present invention.

FIG. 1 shows an admission card suitably designed as an access authorization means for carrying out the method as defined by the invention is shown by way of example in the drawing. Said admission card as a whole is denoted by reference numeral 1, and substantially consists of at least two plastic sheets 2, which are applied one on top of the other, for example in a laminated, fused or glued form. At least the foil sheet disposed in the drawing at the top as the clarity of glass. A plant leaf 3, which has been preserved and, if need be, prepared first, for example dyed, is solidly embedded between said two sheets 2. A paper carrier 4, which has been jointly embedded as well, is arranged next to said two sheets. Said paper carrier is provided with a bar code 5 and a memory chip 6, where, for example reference data for the measuring method to be applied are stored.

It may be stated in a coded form in said bar code 5 or memory chip 6, for example only the areas of the leaf 3 defined in the drawing by dashed lines are transilluminated for verification purposes with a reading device, which is not shown in detail.

Any imitation is practically impossible owing to the uniqueness of the leaf 3 used as biogenic material in the present case, i.e. due to its singular structure. Any forgery produced by technical printing means would be conspicuous even to a layman without deeper knowledge because the three-dimensional structure of the leaf 3 cannot be readily realized. Therefore, the method as defined by the invention is characterized by a degree of safety against forgery not known heretofore.

Accordingly, while only a few embodiments of the present invention have been shown and described, it is obvious that many changes and modifications may be made thereunto without departing from the spirit and scope of the invention.

What is claimed is:

1. A method of producing a non-person related access authorization means and verification of the non-person related access authorization means, comprising the following steps:

applying biogenically structured material on the non-person related access authorization means;

detecting characteristic parameters of the biogenic material;

storing the characteristic parameters data in data sets;

verifying defined measurement of preset parameters and comparing the characteristic parameters, with the available data sets; and releasing defined coincidence criteria being satisfied.

2. The method according to claim 1, wherein the characteristic parameters are detected and measured according to measuring instructions specified on the access authorization means.

3. The method according to claim 1, wherein the characteristic parameters contain structural parameters.

4. The method according to claim 1, wherein the characteristic parameters contain material parameters.

5. The method according to claim 1, wherein the biogenic material has a vegetable substrate.

6. The method according to claim 1, wherein the biogenic material has an animal substrate.

7. The method according to claim 1, wherein the characteristic parameters are detected and measured with an optical measuring method.

8. The method according to claim 1, wherein the characteristic parameters are detected and measured by means of a magnetic resonance measuring method.

9. The method according to claim 1, wherein the biogenic material is preserved before it is applied.

10. The method according to claim 1, wherein the biogenic material is provided with an artificial identification.

11. An access authorization means comprising biogenic material (3) embedded in a material (2) transparent to a measuring method to be applied.

12. The access authorization means according to claim 11, further comprising a machine-readable information carrier (4, 5, 6).

13. The access authorization means according to claim 11, wherein the biogenic material is provided with an artificial identification.

* * * * *